(12) United States Patent
Hartramph

(10) Patent No.: US 6,700,227 B2
(45) Date of Patent: Mar. 2, 2004

(54) DIRECT ELECTRODYNAMIC LINEAR DRIVE

(75) Inventor: Ralf Hartramph, Albershausen (DE)

(73) Assignee: Festo AG & Co., Esslingen (DE)

( * ) Notice: Subject to any disclaimer, the term of this patent is extended or adjusted under 35 U.S.C. 154(b) by 138 days.

(21) Appl. No.: 09/808,591

(22) Filed: Mar. 14, 2001

(65) Prior Publication Data
US 2001/0022473 A1 Sep. 20, 2001

(30) Foreign Application Priority Data

Mar. 17, 2000 (EP) .......................................... 00105702

(51) Int. Cl.$^7$ ............................................... H02K 41/00
(52) U.S. Cl. ........................................... 310/12; 310/13
(58) Field of Search .............................. 310/12, 13, 14; H02K 41/02

(56) References Cited

U.S. PATENT DOCUMENTS

| | | | |
|---|---|---|---|
| 4,220,899 A | | 9/1980 | Von der Heide et al. |
| 4,528,466 A | | 7/1985 | Von der Heide et al. |
| 5,317,221 A | * | 5/1994 | Kubo et al. .................. 310/12 |
| 5,440,183 A | * | 8/1995 | Denne ........................ 310/12 |
| 5,535,853 A | * | 7/1996 | Skalski ....................... 187/410 |
| 5,734,209 A | * | 3/1998 | Hallidy ....................... 310/12 |
| 5,808,381 A | | 9/1998 | Aoyama et al. |
| 6,013,959 A | * | 1/2000 | Hoppie ........................ 310/12 |
| 6,037,739 A | | 3/2000 | Hartramph et al. |
| 6,158,857 A | * | 12/2000 | Elgee ......................... 347/104 |
| 6,160,338 A | * | 12/2000 | Ono ........................... 310/309 |
| 6,326,708 B1 | * | 12/2001 | Tsuboi et al. ................. 310/12 |

FOREIGN PATENT DOCUMENTS

| | | | | |
|---|---|---|---|---|
| DE | 19748647 A1 | | 4/1998 | |
| JP | 2001086725 | * | 3/2001 | .......... H02K/41/03 |

* cited by examiner

Primary Examiner—Nicholas Ponomarenko
Assistant Examiner—Iraj A. Mohandesi
(74) Attorney, Agent, or Firm—Hoffmann & Baron, LLP

(57) ABSTRACT

A direct electrodynamic linear drive comprising a drive coil system composed of coils arranged in a row alongside each other on an elongated ferromagnetic core, which coil is able to be supplied with a switched exciting voltage. The drive coil system has a ferromagnetic tube fitting around it, on whose inner side a plurality of permanent magnets are arranged in a row in the longitudinal direction of the tube. The core provided with the drive coil system is adapted to function as a stator and the tube having the permanent magnets as an armature. In this arrangement the ferromagnetic tube serves as a guide tube, as a magnetic return member and as a holder means for the permanent magnets, the possibility of a simple and accurate longitudinal guiding of the tube meaning that elongated units with a small cross section may be manufactured.

11 Claims, 2 Drawing Sheets

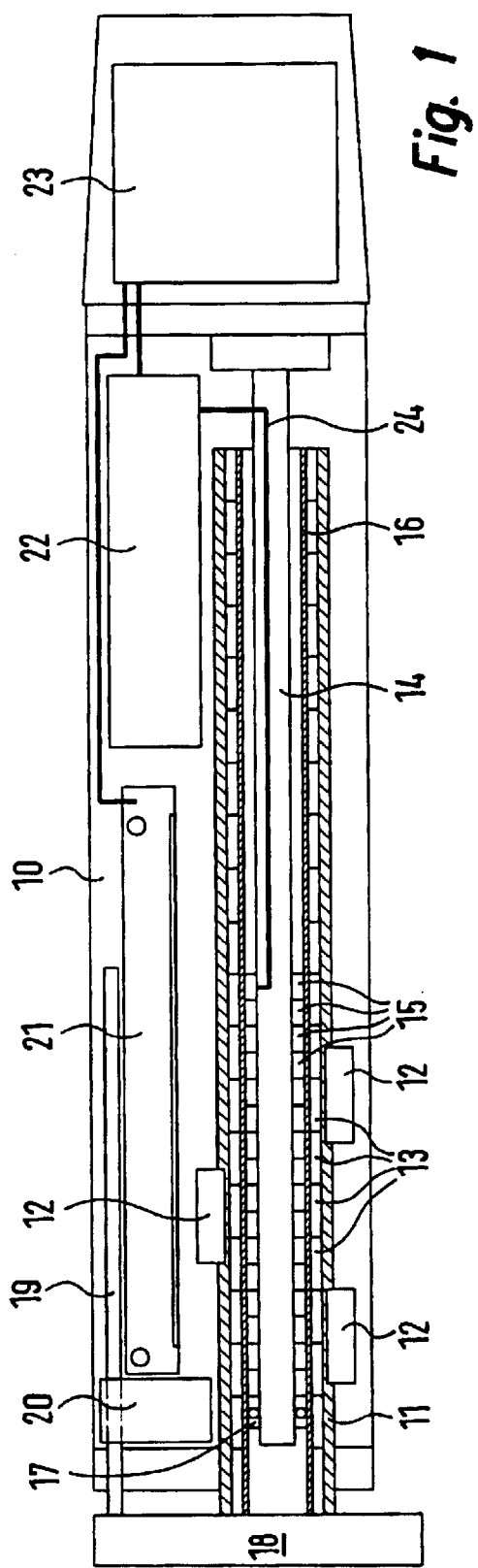
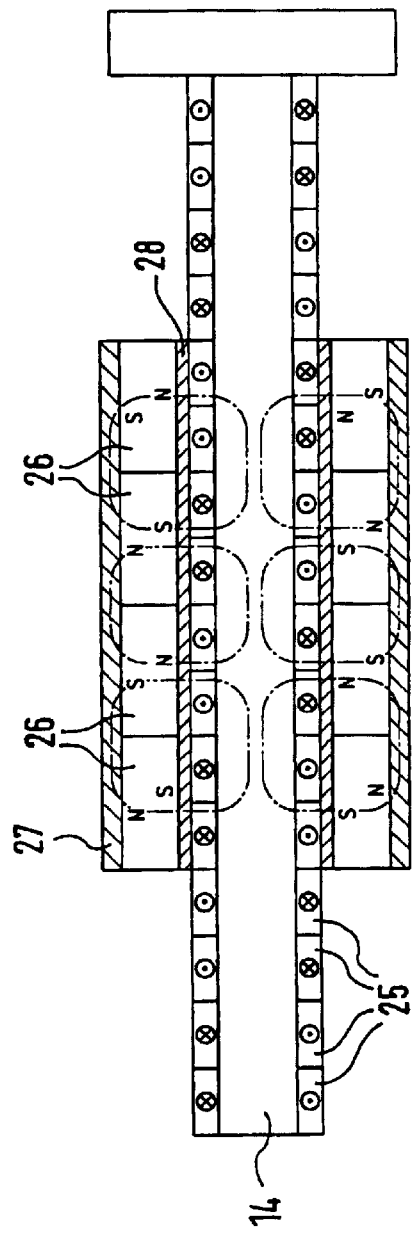

DIRECT ELECTRODYNAMIC LINEAR DRIVE

BACKGROUND OF THE INVENTION

The invention relates to a direct electrodynamic linear drive comprising a drive coil system made up of a plurality of adjacently arranged coils, said system being adapted to be operated by a switched exciting voltage, and a plurality of adjacently arranged permanent magnets, means being provided for relatively moving on the one hand permanent magnets and the drive coil system on the other hand.

THE PRIOR ART

In the case of a previously proposed linear direct drive disclosed in the German patent publication 19,748,647 A1 the coils are arranged on the inner side of a ferromagnetic tube, whereas the permanent magnets are able to be moved within the drive coil system. It is more especially in the case of elongated arrangements that this leads to substantial bearing problems for the permanent magnets able to be moved within the coils and a force transmitting element must be fixed to the magnets.

SHORT SUMMARY OF THE INVENTION

One object of the invention is to create an electrodynamic linear drive, in the case of which the armature may be simply and reliably supported by bearing means even in the case of an extremely long drive.

This object is to be attained with a direct electrodynamic linear drive comprising a drive coil system composed of coils arranged in a row alongside each other on an elongated ferromagnetic core, which coil system is able to be supplied with a switched exciting voltage, and a ferromagnetic tube fitting around the drive coil system, a plurality of permanent magnets being arranged on the inner side of the said tube in a row alongside each other in the longitudinal direction of the tube, the core being provided with drive coil system and designed as a stator and the tube provided with the permanent magnets being designed as an armature.

The ferromagnetic tube surrounding and holding the drive coil system has a multiple function and serves on the one hand as guide element for the armature and on the other hand as a magnetic return member for containing the magnetic field. Such a ferromagnetic tube can be reliably and exactly guided on the outer side by longitudinal guide bearings readily for longitudinal movement, whereas the drive coil system may be fixed in the interior of the tube or, respectively, of the permanent magnets in a stationary manner.

The measures recited in the claims represent advantageous further developments and improvements of the novel direct linear drive specified.

It is an advantage for the tube to be slidingly mounted in a longitudinal duct in a housing, the drive coil system extending into the longitudinal duct from one side. This means that a direct linear drive can be manufactured with an extremely small housing cross section and a great longitudinal extent.

In order to ensure that the drive coil systems is centered in the ferromagnetic tube with relatively small distances from the permanent magnets a non-ferromagnetic guide tube extends along radial inner faces of the permanent magnets, at least one support element being arranged additionally on the elongated core for sliding or rolling along the inner face of the guide tube.

The radially magnetized permanent magnets fit about the drive coil system and are more particularly made up of radially or diametrally magnetized magnet segments or magnet shells.

The guide tube and the permanent magnets may possess a round, oval-like or prismatic cross section, all non-round cross sections preventing relative rotation.

A particularly compact and readily handled arrangement is one in which the housing has integrated in it an electronic regulating and/or control system and/or power system for electrically supplying the drive coil system and/or an electrically operated detecting means for the armature.

The cylindrically wound drive coil system can have one or more strands, and in the case of several coil strands they will be placed on the core in sequence with axially alternating directions of winding. The width of a coil will in this case be equal to the width of a permanent magnet divided by the number of coil strands.

In the case of a multi-strand drive coil system it is convenient to provide for electronic or mechanical commutation of the coil strands in accordance with their respective position in relation to the permanent magnets of the armature.

In order to find or ascertain the armature position a displacement measuring system is provided in the housing, the drive coil system preferably being designed as a displacement or path measuring system.

In the case of a preferred design of such an integrated displacement measuring system the drive coil system is placed in circuit as a differential choke system, wherein by having regions with different magnetic saturation in the iron of the core, caused by the magnets of the armature, changes in inductance are caused and owing to the motion of the armature are correspondingly shifted out of position, a detecting and evaluating means being provided responsive to the inductance changes in the inductance fractions of the differential choke system and therefrom finding the position. Such an integrated displacement or travel measuring system is of independent significance as a subcombination and may also be employed in other direct linear drives, in the case of which a permanent magnet arrangement is able to be shifted in relation to the drive coil system and the latter comprises coils in a row on a ferromagnetic core.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 1 is a diagrammatic section-like overall view of an electrodynamic direct linear drive as one embodiment of the invention.

FIG. 2 shows part of a similar arrangement in the case of which the axial length of the drive coil system is larger than that of the permanent magnet arrangement.

DETAILED ACCOUNT OF WORKING EMBODIMENTS OF THE INVENTION

Figure 3:
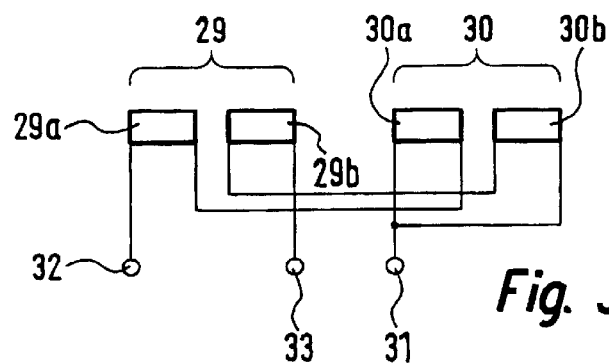
FIG. 3 is a representation to explain the circuit connections of the coil parts of the drive coil system.

In the case of the embodiment of the invention depicted in FIG. 1 in the form of an electrodynamic direct linear drive a housing 10 has a blind hole, in which a ferromagnetic tube 11 is guided by means of bearing units 12 for longitudinal motion. The bearing units 12 engage the outer face of the tube 11 and are in the form of plain or anti-friction bearing arrangments. Same fit as keys in longitudinal grooves, not illustrated in detail, in the ferromagnetic tube 11 to prevent relative rotation. As an alternative to this it is possible for the ferromagnetic tube 11 to have an oval-like or a prismatic cross section instead of a round one, such cross section then in itself preventing relative rotation.

Radially or diametrally magnetized permanent magnet rings composed of magnet segments or magnet shells, which themselves are radially or diametrally magnetized, are placed in the tube 11 acting as a guide tube, such rings being in the following termed magnets 13, which are so arranged and so fixed to the bore of the tube 11 that in the axial direction there is an alternating field sequence with a radial alignment of the field. The tube 11, which for example is in the form of a steel tube, constitutes the armature of the direct linear drive and serves to receive the magnets 13 as a magnet return means for containing the magnetic field and as a guide tube.

The stator arranged within the armature essentially comprises a ferromagnetic core 14, which may be in the form of a steel or iron core of round solid or tube material, on which a cylindrically wound drive coil system 15 is provided. The core 14 provided with the drive coil system 15 is here fixed to one end on the inner side of the housing 10 and extends out into the blind hole or, respectively, the ferromagnetic tube 11 from the inner side of the housing 10. The inner side of the magnets 13 is provided or lined with a non-magnetic, thin-walled lining tube 16, whose bore serves as a sliding face for a support element 17, which is mounted on the free end of the core 14 and itself is designed in the form of a plain or anti-friction bearing. By means of this support element 17 the core 14 and the drive's coil system 15 are reliably guided within the magnets 13 with a minimum gap therebetween.

If the ferromagnetic tube 11 has a non-round cross section then the components contained in it will naturally be suitably shaped to comply.

The end protruding from the housing 10 of the armature or, respectively, tube 11 is connected at its end by way of a connecting element 18 with a rod 19, which extends in parallelism to the tube 11 into a hole in the housing 10 and is guided for motion therein. This rod 19 extends through a detecting means 20, with the aid of which the respective position of the armature may be detected, for example electrically. Such detecting means 20 are known in a large number of different types so that a more detailed description thereof is unnecessary. Furthermore, such rod 19 and/or the tube 11, directly cooperating with the sensor means 21 extending in parallelism thereto, constitutes a displacement measuring system for finding or ascertaining the respective position of the armature. As will be explained at greater length later, it is possible for the sensor means 21 and the corresponding displacement measuring system to be dispensed with by connecting up the drive coil system 15 as a differential choke system and additionally as a displacement measuring system.

Furthermore the housing 10 contains electronic power circuitry 22 and control and/or regulating electronic circuitry 23. The electrical components are in this case connected with each other by lines, the drive coil system 15 being more particularly connected with the aid of a line 24 with the electronic power circuitry 22.

The drive coil system 15 may be single or multi-strand in structure, the corresponding coil strands alternating axially respectively in their direction of winding. The coil width should be selected in a manner dependent on the width of the magnets 13 employed in accordance with the division of the whole number of coil strands. This means that in the case of the two strand drive coil system 15, represented in the working example of the invention, the width of a coil part is equal to half the width of a magnet 13. In the case of use of multi-strand coil systems commutation of the coil strands is necessary in accordance with their positions in relation to the magnets 13 of the armature. Such an inherently known commutating arrangement is not illustrated in detail and may be electronic or mechanical.

The length of the drive coil system 15 in relation to the length of the permanent magnetically excited armature is dependent on the purpose of use. As shown in FIG. 1 the drive coil system 15 is shorter than the total number of magnets in the permanent magnet arrangement. This means that the drive coil system is optimally employed and a part of the permanently magnetic armature is temporarily unused. Owing to the optimum employment of the drive coil system better efficiency is achieved, although however the mass of the armature is increased.

FIG. 2 shows just a part of a stator and an armature on a larger scale to indicate the other case, i.e. the drive coil system 25 depicted there is longer than the permanent magnet arrangement consisting of four magnets 26, and longer than the corresponding armature. A ferromagnetic tube 27 is correspondingly shortened which receives the magnets 26 and an inner non magnetic thin-walled tube 28 is also shortened. In this arrangement the magnet volume is optimally used, the partly unused coil regions producing unnecessary heat. On the other hand the armature's mass in such an arrangement is reduced, something which improves the dynamic properties. In FIG. 2 the magnetic field lines are diagrammatically represented in chained lines and the direction of winding of the coil parts of the drive coil system 15 are indicated using conventional symbols.

As a source of power for the electrodynamic direct linear drive only one power supply connection (not illustrated) and only one control connection with an external central arrangement are required, such connections being for example in the form of a field bus or a binary bus. All initializing and regulation operations are implemented by the integrated electronic circuitry, something which renders the unit extremely easy to handle and minimizes the amount of wiring necessary.

The function of the integrated displacement measuring means is based not, like the prior art of the type initially mentioned, on the measurement of moving, highly permeable cores in the differential choke systems, but on the measurement of changes in inductance caused by saturation phenomena, which are shifted by the movement of the armature, which owing to the magnets 13 is permanently magnetic, and thus cause changes in inductance along the displacement, which changes may then for instance be detected by way of methods indicated in the prior art cited.

FIG. 2 shows the principal field configuration of the linear drive with all significant components. Owing to the containment of the field by the core 14 induction changes of different intensity result. Such changes may be split up into regions of weak induction, that is to say also of weak magnetic saturation in the iron, and into regions of strong induction, that is to say of strong magnetic saturation in the iron. From the relationship between induction with the known BH magnetization line of the iron material employed (B meaning induction and H meaning field strength) which may also be represented in a μB characteristic or function, we obtain a certain variation in permeability (μ) in the iron core in the axial direction.

The variation in permeability is set by the permanent magnets of the armature and accordingly the position of the armature. This variation in permeability may be employed electrically for detecting the position by way of the coil inductance of the drive coil system 25. The coil inductance is dependent on the magnetic resistance and the number of winding turns. The magnetic resistance is for its part not only dependent on the volume of the material or the area and the magnetic length of the field segments (constant in the working example) but also on the permeability.

In order to be able to now use the principle of integrated displacement measurement, it is necessary for the drive coil system 25 and, respectively, 15 to be so designed that a differential choke system is produced. This will be explained with reference to FIG. 3 and two coil parts 29 and 30 of the drive coil system 25 and, respectively, 15 used in the working embodiment of the invention. In the case of this two strand coil system employed in the working example, in which in the axial direction every second coil part 29 and 30 as connected in series leads to one strand, these coil parts 29 and 30 are again divided up into coil regions 29a and 29b and also respectively 30a and 30b and so wound that there is a strand divided into two arts in which every first region part 29a of a coil part 29 is placed in circuit with every further first coil region 30a of a coil part 30 of the same strand in series to produce a half strand (the supply strand) and every second coil region 29a and 29b of the coil part 29 and 30 is placed in series with one second half strand (the return strand). The connection point between the supply and return strands is also made available as a center tap terminal 31 between the end terminals 32 and 33.

Each further strand is placed in circuit in this same manner. Since now the changing variation in permeability in the respective coils of a half strand is geometrically offset on movement of the armature therethrough, in the respective strand parts (which owing to the connection in series may respectively be looked upon as single inductance) sinusoidal inductance variations will result which are offset in relation to each other in accordance with the distance apart of the coil parts. Owing to the particular coil circuit arrangement of the half strands there is now a differential choke system in accordance with FIG. 4, which comprises the two inductance parts $L_1$ and $L_2$, in the case of which, unlike prior known designs, there is no core motion. In this differential choke system it is now possible, using the inductance measuring method represented in FIG. 4 and previously proposed in the cited prior art, to ascertain the ratio between the two inductance fractions $L_1$ and $L_2$ of the half strands of a complete strand.

Figure 5:
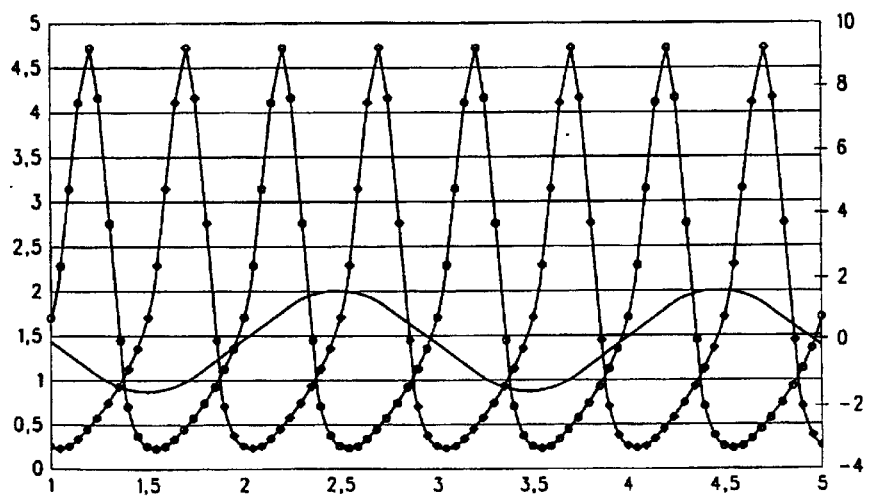
FIG. 5 is a signal graph for explaining the workings of the system.

By now plotting the inductance changes of both complete strands against displacement, we will have the signal curves indicated in FIG. 5. The idealized true sine curve will correspond to the variations in induction in the iron core (left hand scale) and the asymmetrical curves will correspond to the computed induction variations in the two strands of the motor windings on full movement of the armature, which represent the displacement signals (right hand scale) to be evaluated or processed. These curves are asymmetrical, since magnetization characteristics of the material utilized are non-linear. Measurement of the displacement is now performed on the one hand by counting the respective periods and interpolation of the analog intermediate values so that we have a relative displacement measuring system with absolute displacement interpolation in the respective segments.

Figure 4:
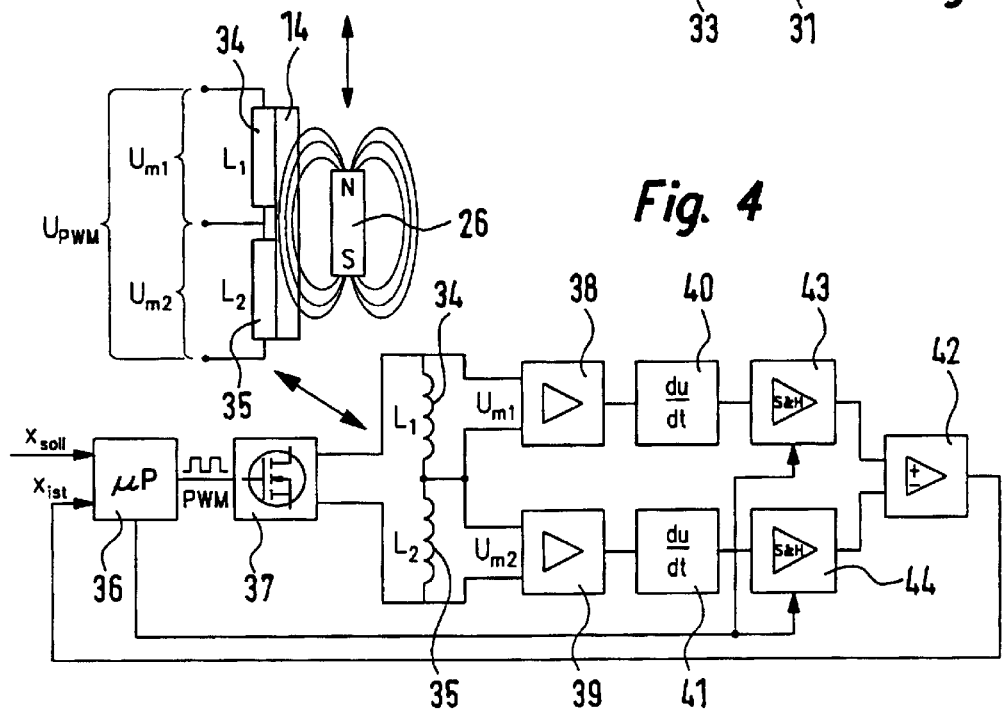
FIG. 4 shows a known evaluating or processing circuit for a displacement or travel measuring system in the form of a differential choke system.

For detection of the position values on the basis of the signal variations use is made of the known circuit illustrated in FIG. 4. As already mentioned the two half strands 34 and 35 of the complete strand of the drive coil system 25 and, respectively, 25 are connected in series. Operation takes place by the application of a pulse width modulated square pulse voltage $U_{PWM}$, which is generated in a position or path regulator 36 designed in the form of microprocessor and by way of a driver stage 37 to the half strands 34 and 35.

For the measurement of the inductance changes the voltage drops $U_{m1}$ and $U_{m2}$ across the half strands 34 and 25 are decoupled separately using a respective measuring or precision amplifier 38 and 39 and as regards the signal level adapted to the following electronic evaluating circuit. Accordingly representations of the voltage parts across strands 34 and 35 will be present at the outputs of the measuring amplifiers 38 and 39. By electronic differentiation in the following differentiating stage 40 and 41 of the voltage signals at the output of the measuring amplifiers 38 and 39 respectively shortly after switching over the pulse width modulated setting signal it is possible for the inductance ratio of the two half strands 34 and 35 to be ascertained which are switched at the pulse frequency. By subtraction of the rates of increase of the voltages for the two half strands 34 and 35 by means of a subtraction stage 42 for the accuracy of the detection of the inductance ratio may be increased by elimination of interfering DC factors. If the detection of the inductance ratio is always performed at the same point in time after switching over the setting signal and intermediately stored in the working example in a sample and hold means 43 and 44, there will accordingly be a displacement-dependent quasi-continuous DC signal at the output of the subtraction stage 42. In extensive parts thereof this signal will be linearly dependent on the armature position and consequently corresponds to the respective true position value $x_{ist}$ of the armature.

The signal $x_{ist}$ present at the output of the subtraction stage 42 is now employed for regulation by coupling such signal with a target position value $x_{soll}$ and deriving from this the control signal. Accordingly using the arrangement described it is possible to perform the displacement and also a displacement signal.

The above described displacement measuring system is not only suitable for electrodynamic direct linear drives in accordance with the working examples but also for other electrodynamic direct linear drive, which differ in design from the working embodiments herein.

What is claimed is:

1. A direct electrodynamic linear drive comprising a drive coil system comprising coils arranged in a row alongside each other on an elongated ferromagnetic core, which coil system is able to be supplied with a switched exciting voltage, and a ferromagnetic tube fitting around the drive coil system, a plurality of permanent magnets being arranged on the inner side of the said tube in a row alongside each other in the longitudinal direction of the tube, the core being provided with drive coil system and designed as a stator and the tube provided with the permanent magnets being designed as an armature.

2. The direct linear drive as set forth in claim 1, wherein the tube is arranged in a sliding manner in a longitudinal duct in a housing, the drive coil system extending into such longitudinal duct from one end thereof.

3. The direct linear drive as set forth in claim 1, comprising a non ferromagnetic tube extending along radial inner faces of the permanent magnets and at least one support element arranged on the elongated core, said support element being adapted to slide or roll along the bore face of the guide tube on motion of the armature.

4. The direct linear drive as set forth in claim 1, wherein the radially magnetized permanent magnets fit around the drive coil system and more especially are made up of radially or diametrally magnetized magnet segments or magnet shells.

5. The direct linear drive as set forth in claim 1, wherein the guide tube and the permanent magnets have a round, oval-like or prismatic cross section.

6. The direct linear drive as set forth in claim 1, wherein the housing has integrated in it an electronic regulating and/or control system and/or power system for electrically supplying the drive coil system and/or an electrically operated detecting means for the armature.

7. The direct linear drive as set forth in claim 1, wherein the drive coil system is cylindrically wound and has one or more strands, and in the case of there being several coil strands are placed in sequence with axially alternating directions of winding on the core.

8. The direct linear drive as set forth in claim 7, wherein the width of a coil of the drive coil system is equal to the width of a permanent magnet divided by the number of coil strands.

9. The direct linear drive as set forth in claim 7, comprising an electronic or mechanical commutating means for the coil strands in accordance with their respective position in relation to the permanent magnet of the armature and wherein said drive coil system has a plurality of strands.

10. The direct linear drive as set forth in claim 1, comprising a displacement measuring system integrated in the housing, the drive coil system being more particularly designed in the form of a displacement measuring system.

11. An electrodynamic direct linear drive comprising a drive coil system comprising coils arranged in a row alongside each other on an elongated ferromagnetic core, which coil system is able to be supplied with a switched exciting voltage, a permanent magnet arrangement designed in the form of an armature and comprised of a plurality of permanent magnets placed alongside one another in a longitudinal direction, such arrangement being able to be slid in relation to a winding system, the drive coil system also being a component of a displacement measuring system for the armature, which has the drive coil system located in circuit as a differential choke system since regions having different iron saturation in the core, such saturation being due to permanent magnets of the armature, cause changes in inductance and owing to the motion of the armature are correspondingly shifted and wherein a processing and evaluating means is provided for ascertaining the inductance variations of the inductance parts of the differential choke system and from this the position of the armature.

\* \* \* \* \*

UNITED STATES PATENT AND TRADEMARK OFFICE
CERTIFICATE OF CORRECTION

PATENT NO. : 6,700,227 B2
APPLICATION NO. : 09/808591
DATED : March 2, 2004
INVENTOR(S) : Ralf Hartramph It is certified that error appears in the above-identified patent and that said Letters Patent is hereby corrected as shown below:

Column 6:

Line 39, now reads: "position value $x_{soil}$ and deriving from"

should read: -- position value $x_{soll}$ and deriving from --

Signed and Sealed this

Fifth Day of February, 2008

JON W. DUDAS
*Director of the United States Patent and Trademark Office*